United States Patent

[11] 3,614,222

| [72] | Inventors | Gerald Post<br>Kew Gardens;<br>Charles M. Buchholtz, New York, N.Y.;<br>Luciano Rattin, Ivrea, Italy |
|---|---|---|
| [21] | Appl. No. | 31,713 |
| [22] | Filed | Apr. 24, 1970 |
| [45] | Patented | Oct. 19, 1971 |
| [73] | Assignee | Ing. C. Olivetti & C., S.p.A.<br>Ivrea, Italy |

[54] OPTICAL DRIVE SYSTEM FOR REPRODUCING MACHINE
13 Claims, 18 Drawing Figs.

| [52] | U.S. Cl. | 355/8, 355/60, 355/66 |
|---|---|---|
| [51] | Int. Cl. | G03g 15/00 |
| [50] | Field of Search | 355/3, 8, 57, 58, 60, 64, 65, 66 |

[56] References Cited
UNITED STATES PATENTS

| 2,478,555 | 8/1949 | Yule | 355/60 X |
|---|---|---|---|
| 3,330,181 | 7/1967 | Jakobson | 355/66 X |
| 3,431,053 | 3/1969 | Wick | 355/66 |
| 3,533,691 | 10/1970 | Suzuki | 355/13 |
| 3,542,467 | 11/1970 | Ferguson | 355/8 |

Primary Examiner—Samuel S. Matthews
Assistant Examiner—Monroe H. Hayes
Attorneys—Kevin McMahon and Samuel Lindenberg ABSTRACT: A copying machine which enables the choice of different magnification or reduction ratios comprising a glass plate on which the document to be copied is placed, a reproducing drum which converts light images focused thereon, into visible images on copy paper, and an optical system which scans a document on the glass plate and focuses the scanning image on the reproducing drum. The optical system includes two mirror-holding carriages that sweep across the glass plate, for reflecting light from a document on the glass plate through a stationary lens onto the reproducing drum. The carriages are moved by a cable wound by a drum, the cable being fixed to a first of the carriages and extending around a pulley on a second of the carriages so the second carriage moves at half the speed of the first. The cable extends around a compensating pulley which can be moved by a cam to alter the speed of the carriages relative to the speed of the reproducing drum, for copying at different reduction ratios. One end of the cable is held by an arm which can be adjusted in position to vary the position of the second carriage without altering the position of the first carriage, which is required for copying at different reduction ratios.

INVENTORS
CHARLES M. BUCHHOLTZ
GERALD POST
LUCIANO RATTIN
BY
Lindenberg, Freilich & Wasserman
ATTORNEYS

INVENTORS
CHARLES M. BUCHHOLTZ
GERALD POST
LUCIANO RATTIN
BY
Lindenberg, Freilich, & Wasserman
ATTORNEYS

INVENTORS
CHARLES M. BUCHHOLTZ
GERALD POST
LUCIANO RATTIN
BY
Lindenberg, Freilich & Wasserman
ATTORNEYS

OPTICAL DRIVE SYSTEM FOR REPRODUCING MACHINE

BACKGROUND OF THE INVENTION

1. Field of the Invention

This invention relates to copying and reproducing machines.

2. Description of the Prior Art

Many types of reproducing machines employ a glass plate on which a document or other material to be reproduced can be laid, a reproducing drum, and an optical system which scans material on the glass plate to form an image thereof on the reproducing drum. In some systems, the drum is constructed to retain an electrostatic charge in accordance with the image thereon, and to hold toner particles at the charged regions for application to paper to print an image on the paper. In some other systems, the reproducing drum carries electrostatic-copying paper, such as zinc-oxide-coated paper, which retains a charge in accordance with the image thereon, and which picks up toner particles at charged regions to form an image.

Various optical systems can be used to scan the document on the glass plate and form an image thereof at the surface of the drum. For example, one system employs stationary mirrors that reflect light from the glass plate to the drum and a carriage that holds a lens which moves across the document by a pulley arrangement. Such systems allow a particular reduction ratio between document size and copy size such as 1:1, but generally do not allow for a change in this ratio. A change in reduction ratio is often desirable to enable original documents of various sizes to be converted into copies of a standard size.

OBJECTS AND SUMMARY OF THE INVENTION

An object of the present invention is to provide a simple optical-scanning system for reproducing machines.

Another object is to provide a reproducing machine which can readily change the magnification at which copies are made, while enabling all documents to be aligned by locating one corner at a constant position on a document-holding plate.

In accordance with one embodiment of the invention, a copying machine is provided which includes two mirror-holding carriages which move across a document-holding glass plate. The mirrors reflect light from the document through a stationary lens which forms an image on the reproducing drum. The two carriages are moved by a cable that is pulled by a cable-winding drum, the cable fixed to the first carriage and extending around a pulley that is mounted on the second carriage, so that the second carriage moves at one-half the speed of the first carriage. The first carriage must move at the same speed as the surface of the reproducing drum for a 1:1 reduction ratio, but must move 1.4 times as fast for a 1:0.7 reduction ratio. To allow for a change in carriage speed relative to the reproducing drum, a pulley is provided for engaging the cable to additionally pull the cable as it is being wound on the winding drum.

In order to set up the system for a 1:0.7 reduction ratio, the second carriage must be shifted further away from the first carriage and the lens must be shifted closer to the reproducing drum. In order to reposition the second carriage with respect to the first, one end of the cable is held by an arm which can be moved to different positions by cams. The lens is mounted on a lens carriage that is coupled to the same cams that move the cable-holding arm, so that the second carriage and lens are simultaneously shifted by movement of the cams.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
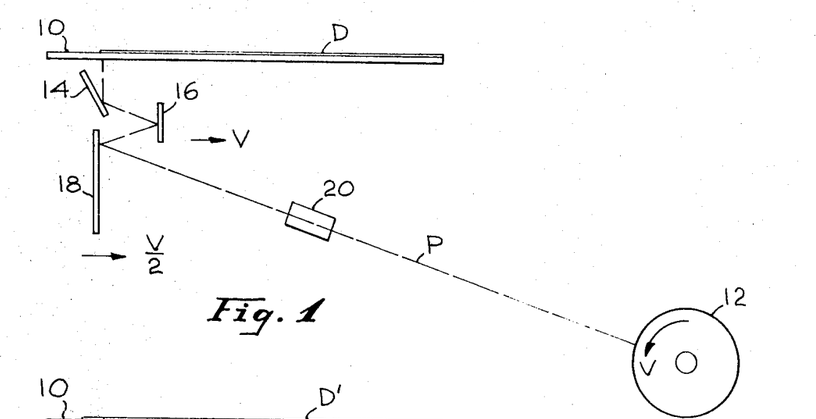
FIG. 1 is a simplified side elevation view of a copying machine constructed in accordance with the invention.

As shown in FIG. 1, the copying machine includes a document-holding glass plate 10 which can hold a document D laid face down thereon, a reproducing drum 12, and an optical system which scans the document D and forms an image thereof on the surface of the drum 12 (or on electrostatic copy paper carried by the reproducing drum.) The optical system moves light along an optical path P, light from the document being reflected by three mirrors 14, 16, 18, and passing through a focusing lens 20, which forms an image on the drum. Under the most common operating conditions, the copy is to have the same size as the original document D. In this situation, the mirrors 14, 16 must move at a velocity V equal to the velocity at the surface of the reproducing drum 12. The mirror 18 must move parallel to the other mirrors 14, 16, but at the speed v/2 which is one-half the speed of the other mirrors. The lens 20 remains stationary. For a different magnification ratio, the lens 20 must be repositioned, the initial position of the mirror 18 must be changed, and the mirrors 14, 16 and 18 must be moved at a different speed relative to the surface speed $V$ of the drum 12.

Figure 1A:
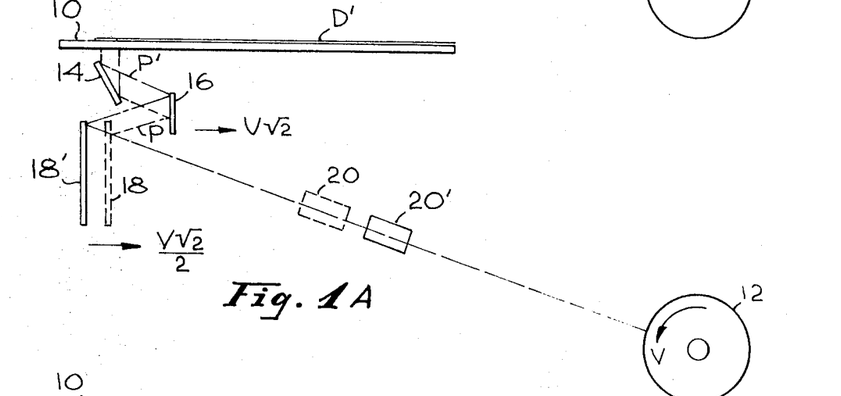
FIG. 1A is a view similar to FIG. 1, but with the lens and second carriage shifted to different positions for a different copying ratio.

Fig. 1A indicates the situation when a document D' having twice the area of document D, is to be copied so that the finished copy has the same size as the document D. In other words, the document D' is $\sqrt{2}$ or 1.4 times as long and 1.4 times as wide as the smaller document D, but its copy is to be reduced to the size of document D. In order to make such a size reduction, the lens is moved to the position 20' and the mirror 18 is moved to the initial position 18'. The movement of the lens to position 20', which is closer to the reproducing drum, is performed so that the lens forms a smaller image on the reproducing drum. However, in order for the image to be focused on the drum, the optical path between the document D' and lens must be increased by moving mirror 18 away from mirror 16. The relationship between the document to lens distance S and lens to drum distance S' can be given by the well-known equation $1/S+1/S'=f$, where $f$ is the focal length of a thin lens.

In addition to movement of the lens 20 and change of the initial position of mirror 18, to effect a change in copying ratio to 1:0.7, it is necessary to change the velocity of the carriages. For a drum velocity $V$, the mirrors 14, 16 now must be moved at the speed of $V\sqrt{2}$ and mirror 18' must be moved at the speed $V\sqrt{2}/2$. It may be further noted that an additional shift of the lens 20' in a lateral direction (into the paper as seen in FIG. 1A) may be made to account for the position at which larger documents are placed on the document-holding glass plate 10.

Figure 1B:
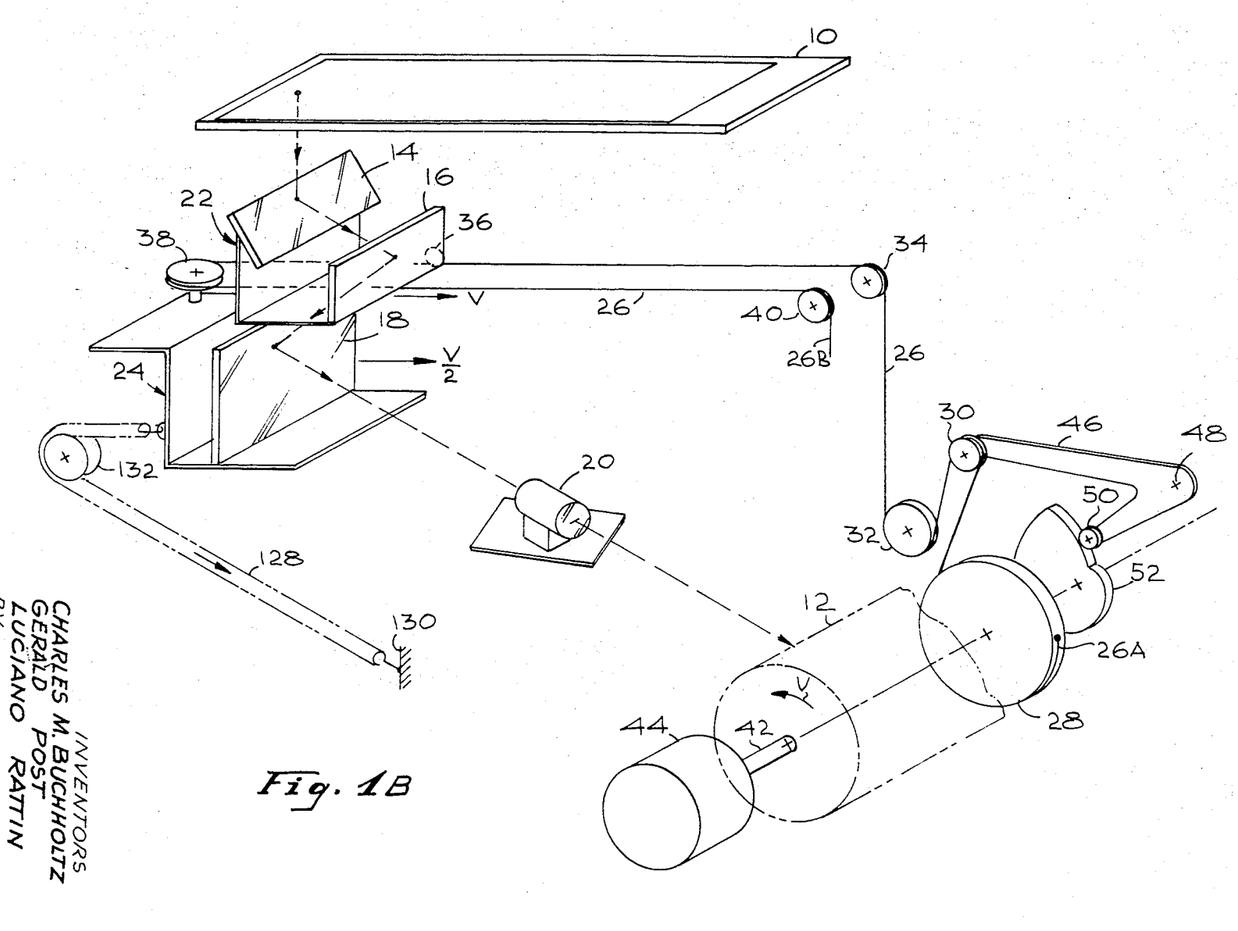
FIG. 1B is a more detailed partial perspective view of the copying machine of FIG. 1.
Figure 1C:
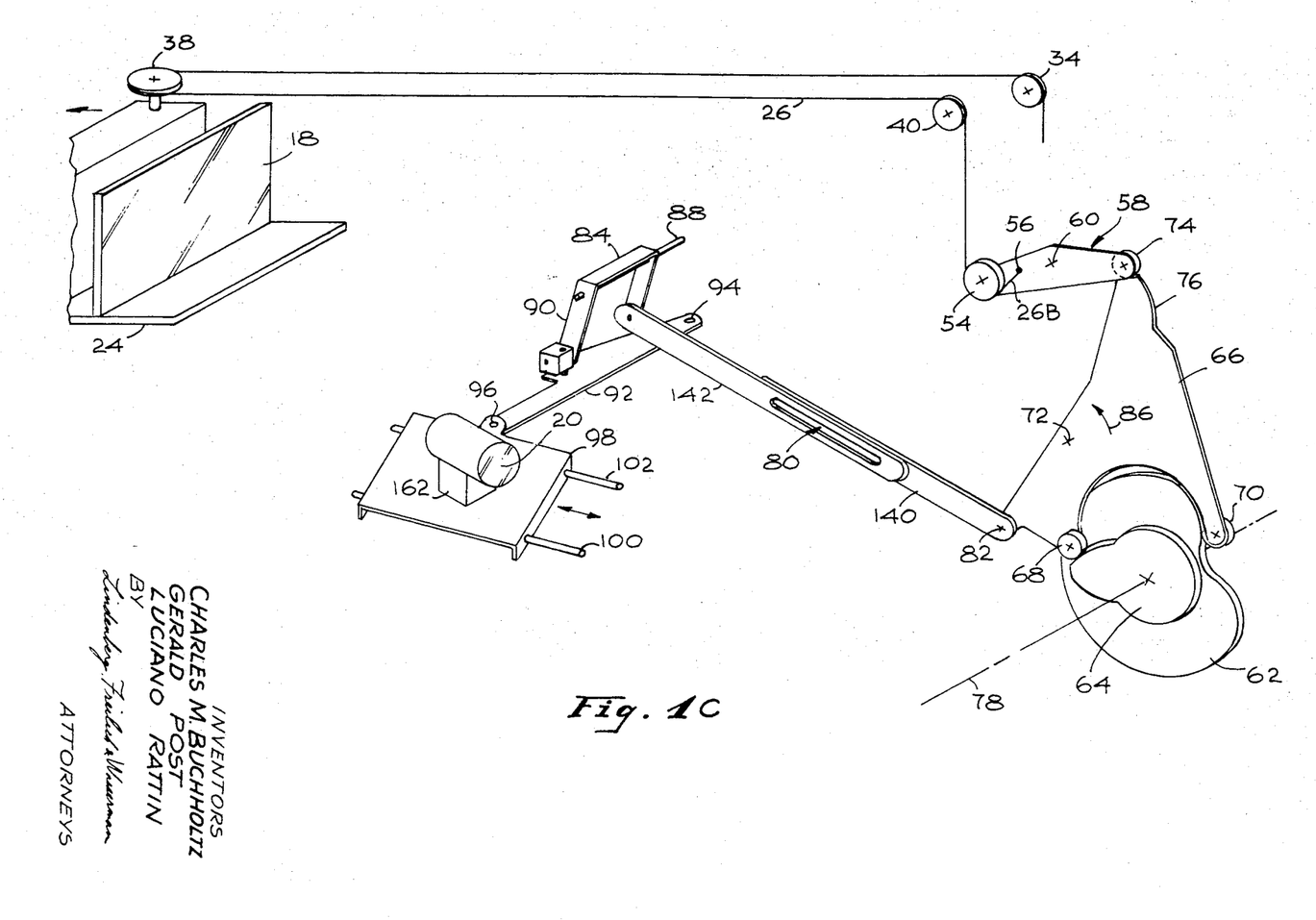
FIG. 1C is a partial perspective view of the copying machine of FIG. 1B, showing additional portions thereof.
Figure 2:
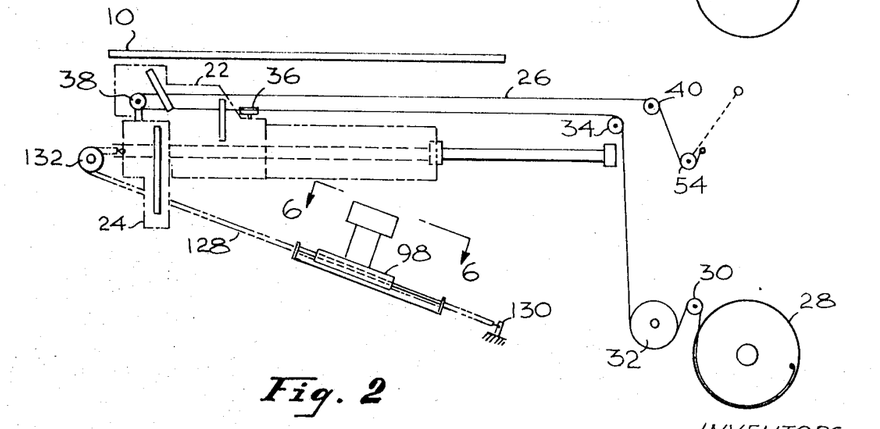
FIG. 2 is a partial side elevation view of the apparatus of FIG. 1 for a 1:1 copying ratio, showing some additional details thereof.

FIGS. 1B and 1C illustrate some of the details of the mechanisms for moving the mirrors 14, 16 and 18 in a manner that allows for accurate copying of documents at two size ratios. As shown in FIG. 1B, the mirrors 14, 16 are mounted on a first carriage 22 while the other mirror 18 is mounted on a second carriage 24. Both carriages 22, 24 are guided in motion parallel to the glass plate 10 on which an original document to be copied is placed. The two carriages are moved by a cable 26 which extends from a winding drum 28, up and around a compensating pulley 30, down and around a first guide pulley 32, and up and around a second guide pulley 34. From second guide pulley 34, the cable 26 extends parallel to the path of carriage 22, and is fixed to the carriage 22 at the position 36. From the position 36, the cable extends around a carriage pulley 38 which is rotatably mounted on the second carriage 24, and then extends over a third guide pulley 40 and down to a position where its end 26B is fixed in place, as will be explained below.

During copying at a 1:1 reduction or copying ratio, the pulley 30 is stationary (pulleys 32, 34 and 40 are always stationary). For this copying ratio, the reproducing drum 12 and cable winding drum 28 both turn in the direction of arrow $V$ and at the same speed, by a shaft 42 that is driven by a gear head motor 44. Accordingly, the cable 26 pulls the first carriage 22 at the velocity $V$ along its path and pulls the other carriage 24 at the velocity $v/2$ along its path parallel to the first carriage. Therefore, the carriages 22, 24 move at a proper ratio of speeds with respect to each other and the reproducing drum 12, to scan the document and properly image it on the reproducing drum.

When it is desired to change the reduction ratio from 1:1 to 1:0.7 (i.e., $\sqrt{2}:1$) then the carriages 22, 24 must move at a different ratio with respect to the drum 12. This is accomplished by movement of the compensating pulley 30 as the carriages move. The compensating pulley 30 is rotatably mounted on one arm of a compensating crank 46. The crank 46 is pivotally mounted at 48 on the machine frame and it has an end which carries a cam follower 50. The cam follower 50 is engaged with a compensating cam 52, the cam 52 being driven at the same rotational speed as the reproducing drum 12 when a 1:0.7 reduction ratio is desired (otherwise cam 52 does not rotate). The compensating cam 52 is shaped so that it moves the crank 46 and compensating pulley 30 thereon to alter the movements of the mirror-holding carriages in a particular manner. Specifically, the cam is constructed so that the compensating pulley 30 moves upwardly during copying, in a manner to increase the velocity of the first carriage 22 to the velocity $\sqrt{2}V$ (where $V$ represents the surface velocity of the reproducing drum.) The second carriage 24 moves at one-half the speed of the first, and therefore at the velocity $\sqrt{2}V/2$. Thus, the compensating cam 52, crank 46 and compensating pulley 30, enable a change of the velocity of the carriages relative to the reproducing drum 12 to enable a change in copying ratio.

When it is desired to make a change in copying ratio, it is necessary to change the relative positions of the first and second carriages 22, 24, in addition to changing their velocities relative to the reproducing drum during the actual copying as described above. FIG. 1C illustrates additional portions of the mechanism, showing the apparatus for shifting the initial position of the second carriage 24. As shown in FIG. 1C, the cable 26, after passing around the third guide pulley 40, extends around a fourth guide pulley 54, and is fixed at 56 to a carriage-shifting lever 58. The carriage-shifting lever 58, which is pivotally mounted at 60 on the machine frame, does not pivot during the copying of a document, but is pivoted only to change the machine to a different reduction ratio. Such shifting of lever 58 occurs only during the setting up of the machine for a change in reduction ratio. The pivoting of the carriage-shifting lever 58 is accomplished by a pair of cams 62, 64 which can pivot a ratio-changing lever 66, which, in turn, can pivot the carriage-shifting lever 58.

The ratio changing lever 66 has a pair of cam followers 68, 70 that engage the cams 64, 62, to pivot the lever 66 about its pivot point 72 where it is pivotally mounted on the machine frame. The carriage-shifting lever 58 has a cam follower 74 which can ride down along a cam surface 76 on the lever 66, to cause pivoting of the carriage-shifting lever. When the set of cams 62, 64, is pivoted to a predetermined amount such as 180° about the axis 78, the levers 66 and 58 pivot, and the end 26B of the cable attached at 56 to the carriage-shifting lever, moves up (when changing from a 1:1 to a 1:0.7 ratio.) The upward movement of the end 26B of the cable allows the second carriage 24 to move backward away from the first carriage. Thus, pivoting of the set of cams 62, 64 to a new position shifts the second carriage 24 with respect to the first carriage, to ready the machine for a different copying ratio.

The change of reduction ratio not only requires movement of the carriages at different speeds and a shifting of the initial position of the second carriage 24 with respect to the first carriage 22, but also requires a shift in the position of the lens 20. Referring again to FIG. 1C, a shift of the lens 20 to a new position closer to the reproducing drum, is accomplished automatically when the pair of cams 62, 64 is pivoted to shift the position of the second carriage 24. Turning of cams 62, 64 to a new position to pivot the ratio-changing lever 66, causes the lever 66 to pull on a link assembly 80. The link assembly 80 has one end pivotally coupled at 82 to the ratio-changing lever 66 and an opposite end coupled to a first lens carriage crank 84. When the ratio-changing lever 66 pivots in the direction of arrow 86 to change the reduction ratio to 1:0.7, then the pivot point 82 pulls on the link assembly 80 to pivot the crank 84 about a shaft 88 that is mounted on the machine frame. One crank arm 90 is pivotally coupled to a lens lever 92 that is pivotally mounted at 94 on the machine frame. The lever 92 is coupled at a pivot point 96 to a lens carriage 98 ON which the lens 20 is mounted. As the cams 62, 64 pivot the ratio-changing lever 66 in the direction of arrow 86 to change the reduction ratio to 1:0.7, the lens carriage 98 moves along a pair of guide rails 100, 102 to a position closer to the reproducing drum. Conversely, rotation of the cams 62, 64 to their original position moves the lens back to its original position for a 1:1 reduction ratio.

Figure 3:
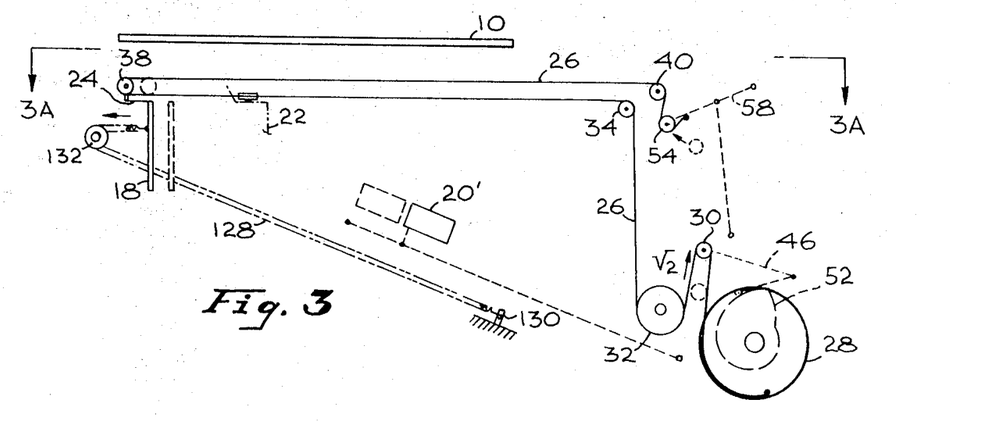
FIG. 3 is a partial side elevation view of the apparatus of Fig. 2 for a 1:0.7 copying ratio.
Figure 3A:
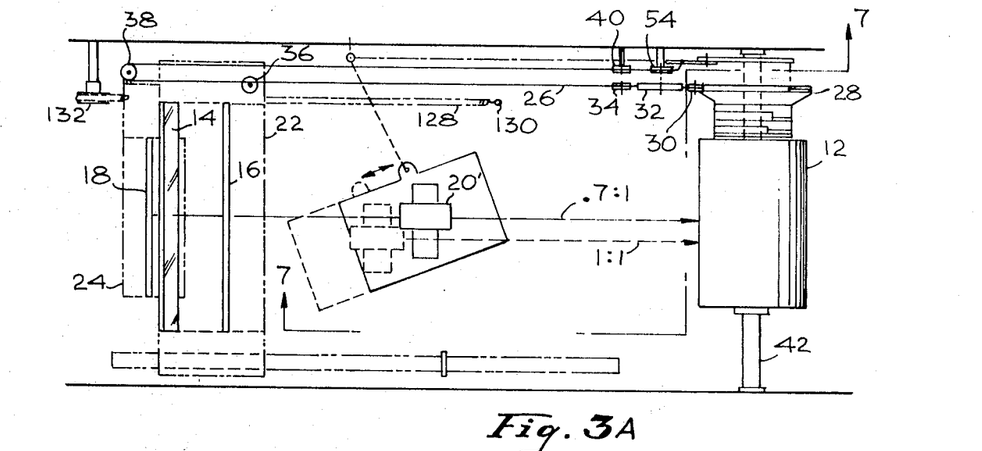
FIG. 3A is a view taken on line 3A—3A of FIG. 3.
Figure 3B:
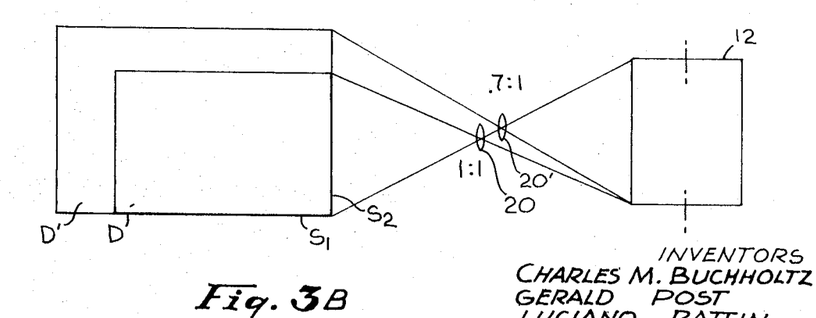
FIG. 3B is a representative view showing the manner in which the lens is shifted to change the copying ratio.

If documents of various sizes were all centered on the document-holding plate 10, then the lens 20 might be moved almost directly towards and away from the reproducing drum 12 in changing between different reproduction ratios. However, it is generally more convenient to employ the alignment method shown in FIG. 3B, wherein documents D and D' of different sizes are positioned by merely aligning two sides S1 and S2 thereof with two edges of the document-holding plate. In order to enable this manner of document placing to be used, the lens 20 must not only shift closer to the reproducing drum 12, for a 1:0.7 reduction ratio, but must also shift laterally in moving to the new position 20'. Such a lateral shift is accomplished by orienting the guides on which the lens carriage moves, at an angle from a direction towards and away from the reproducing drum. Accordingly, the guide rails 100, 102 which guide the lens carriage 98 are angled from a direction toward the drum 12.

Figure 5:
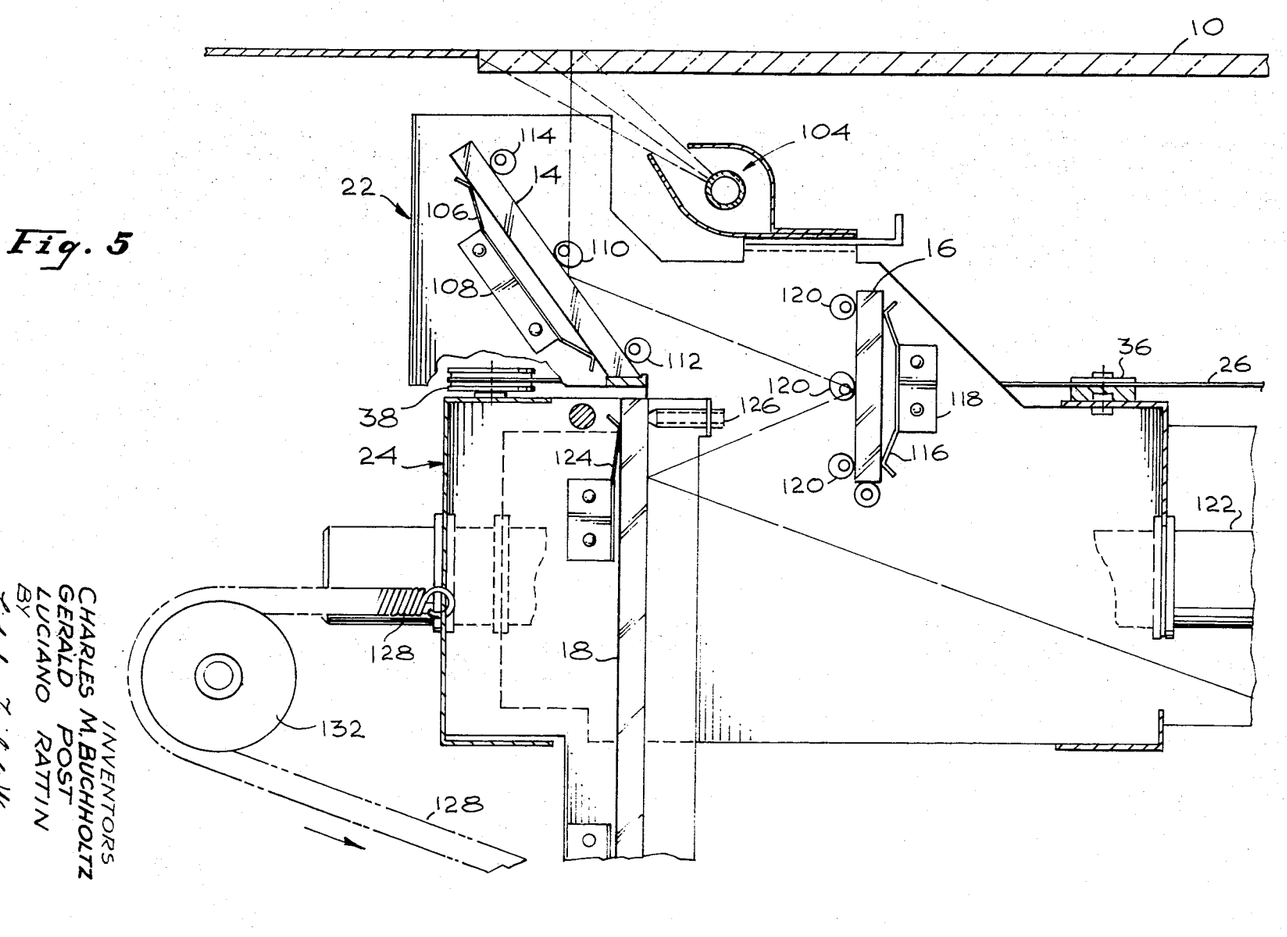
FIG. 5 is a view taken on the line 5—5 of Fig. 4.

Details of the mechanisms for operating the system in the manner described above, are illustrated in the other figures. FIG. 5 illustrates some of the details of the first carriage 22 and the second carriage 24 on which the three mirrors 14, 16 and 18 are mounted. The carriage 22 holds a lamp assembly 104 which illuminates a region of the document-holding plate 10 which is being scanned by the optical system. The mirror 14 is held on springs 106 that are supported by a bracket 108 that is fixed to the first carriage 22. Three eccentric discs 110, 112 and 114 press the mirror against the spring supports 106 and allow fine adjustments of the position of the mirror. The other mirror 16 is held by spring supports 116 on a bracket 118, and is pressed in place by a group of three eccentric discs 120 which enable adjustment of its orientation. A pair of guide rods 122 at opposite sides of the first carriage, guide it in longitudinal movement along its path. The cable 26 is fixed to the first carriage at point 36 thereon, by a washer that is held down by a screw, with the cable located between the washer and carriage frame. The second carriage 24 is also supported and guided in movement along its linear path by the pair of guide rods 122, although the second carriage is positioned behind the first carriage along these rods. The mirror 18 of the second carriage is held by spring supports 124 and by adjusting screws 126 that are mounted on the second carriage.

As mentioned above, the first and second carriages 22, 24 are driven in a forward direction along their paths during copying, by a winding drum. The return of the carriages in a rearward direction towards their original position is accomplished by a spring 128, as also shown in FIG. 1B. The spring 128 has one end fixed at 130 to the machine frame and an opposite end fixed to the second carriage 24. The spring 128 extends around a pulley 132 to enable a long spring to be utilized in a relatively small space. During forward motion of the carriages (in the direction of arrows V and V/2) which occurs during the copying phase of a cycle, the spring 128 is stretched while the cable-winding drum 28 moves the carriages in a forward direction. At the end of the copying phase of a cycle, the cable-winding drum is released and the spring 128 supplies the power for returning the carriages back to their starting position, as well as unwinding the cable-winding drum. The spring 128 returns the second carriage 24 by directly pulling it. This causes the cable 26 to be pulled, and results in the cable pulling the first carriage 22 back to its original position.

Figure 10:
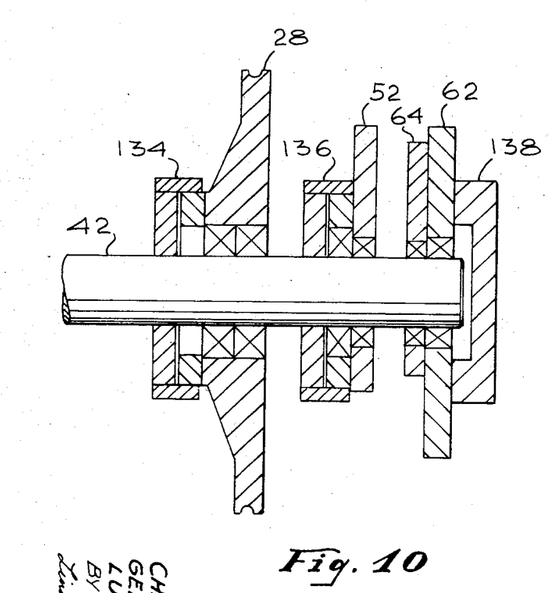
FIG. 10 is a partial side view of the clutch apparatus which drives the cable-winding drum and the cams of FIGS. 7 and 9.

FIG. 10 illustrates highly simplified mechanisms for driving the cable-winding drum 28 during each copying cycle, for rotating the compensating cam 52, and for changing the position of the cams 62, 64 when copying in the 1:0.7 reduction mode. During the copying cycle, the shaft 42 which carries the reproducing drum turns. A magnetic clutch 134 can be energized to couple the shaft 42 to the winding drum 28. At the time in the copying cycle when scanning of the document begins, the clutch 134 is engaged to drive the winding drum 28. After the document has been scanned, the clutch 134 is disengaged to allow the winding drum 28 to rotate in a reverse direction under the force of the spring 128 which pulls back the carriages towards their original position. The magnetic clutch 134 may be any of several well-known types which include an electromagnet that can be energized to engage it, and which automatically disengages when current is removed.

Figure 8:
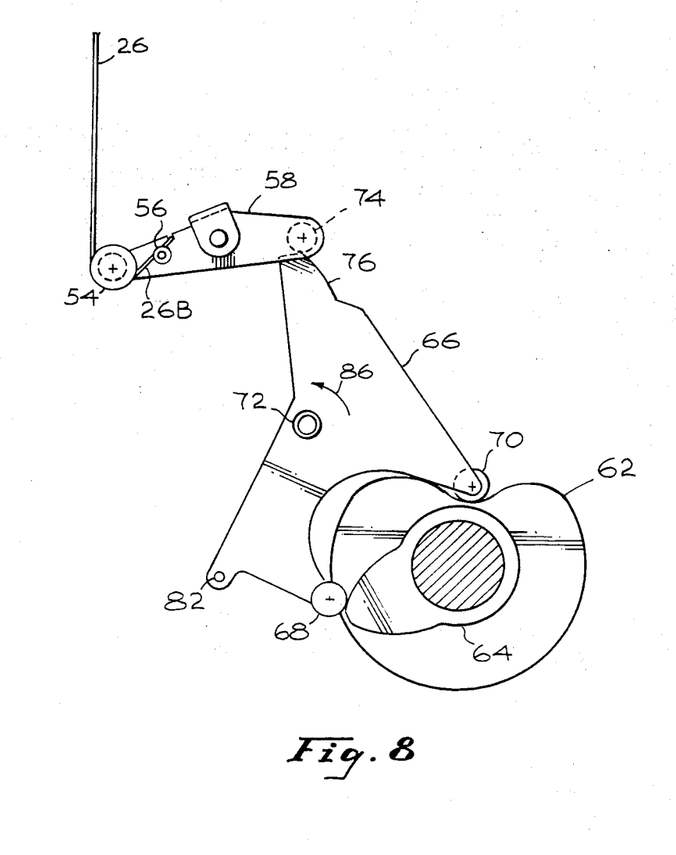
FIG. 8 is a view taken on the line 8—8 of FIG. 7.
Figure 8A:
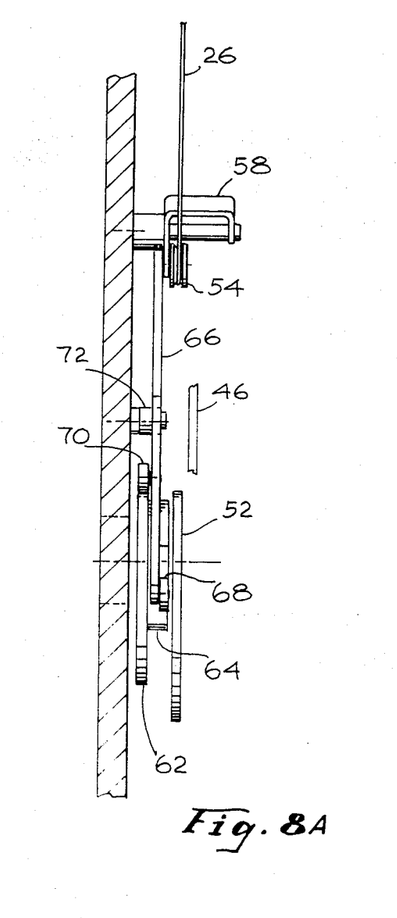
FIG. 8A is an end elevation view of the apparatus of FIG. 8.
Figure 9:
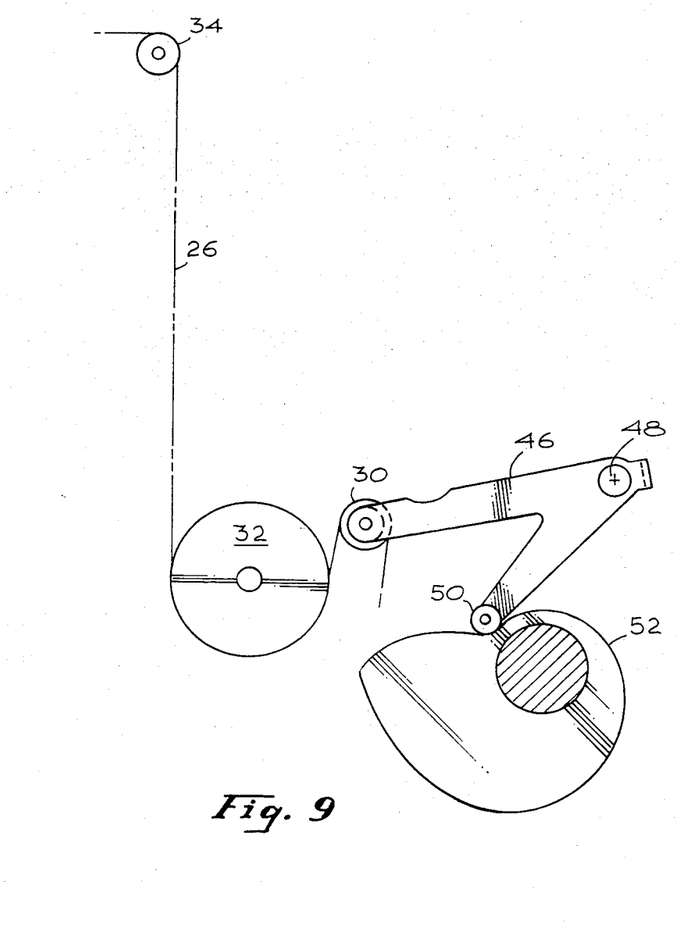
FIG. 9 is a view taken on the line 9—9 of FIG. 7.

Another magnetic clutch 136 can couple the shaft 42 to the compensating cam 52 when it is desired to copy in the 1:0.7 reduction mode. The clutch 136 is energized, and therefore engaged, only at the beginning of the scanning of a document, and is deenergized at the end of the scanning. Prior to copying at a 1:0.7 ratio, the cams 62, 64 must be pivoted to a new position. This is accomplished by a rotational solenoid 138 fixed to the frame of the machine, which rotates the cams 62, 64 to the desired position. Prior to copying in a 1:1 mode, the solenoid 138 must be operated in the reverse direction to return the cams 62, 64 to their original position. Of course, the activation of the rotational solenoid 138 must be accomplished prior to the beginning of the scanning portion of the copying cycle. It should be understood that although magnetic clutches and rotational solenoids can be utilized, the cost of the apparatus can sometimes be reduced by employing mechanical mechanisms specifically designed to perform the required functions. FIGS. 8 and 8A illustrate some of the details of the mechanism which shifts the second carriage to prepare for a different copying ratio. The reason why two cams 62, 64 are used to move the ratio-changing lever 66, is to assure positive pivoting of the lever in both directions. These figures also show the manner in which the lever 66 drives the carriage-shifting lever 58 to which the end 26B of the cable is attached.

Figure 7:
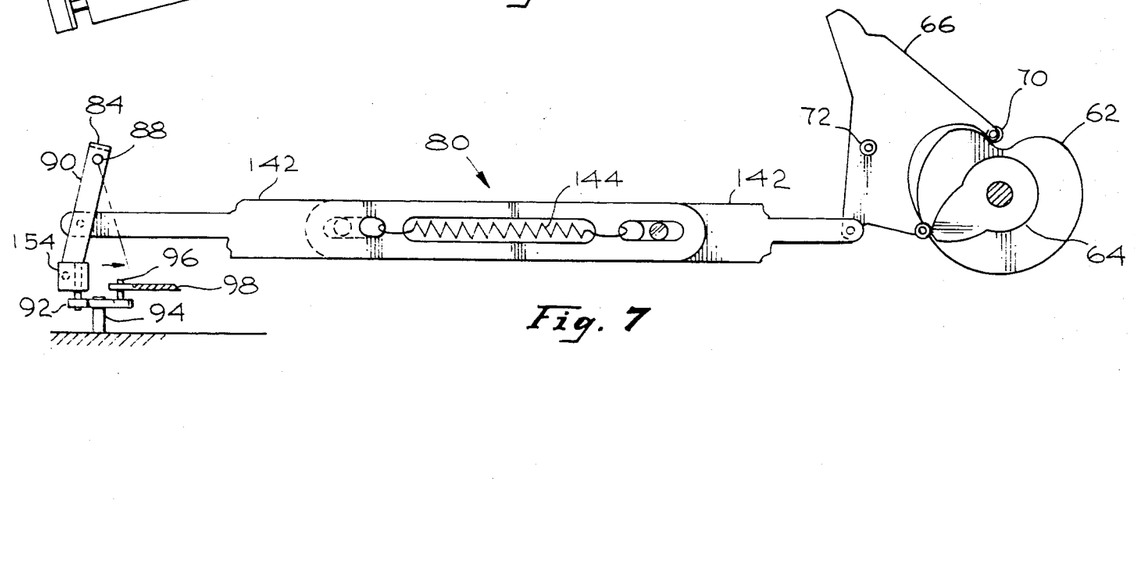
FIG. 7 is a view taken on the line 7—7 of FIG. 3A.
Figure 7A:
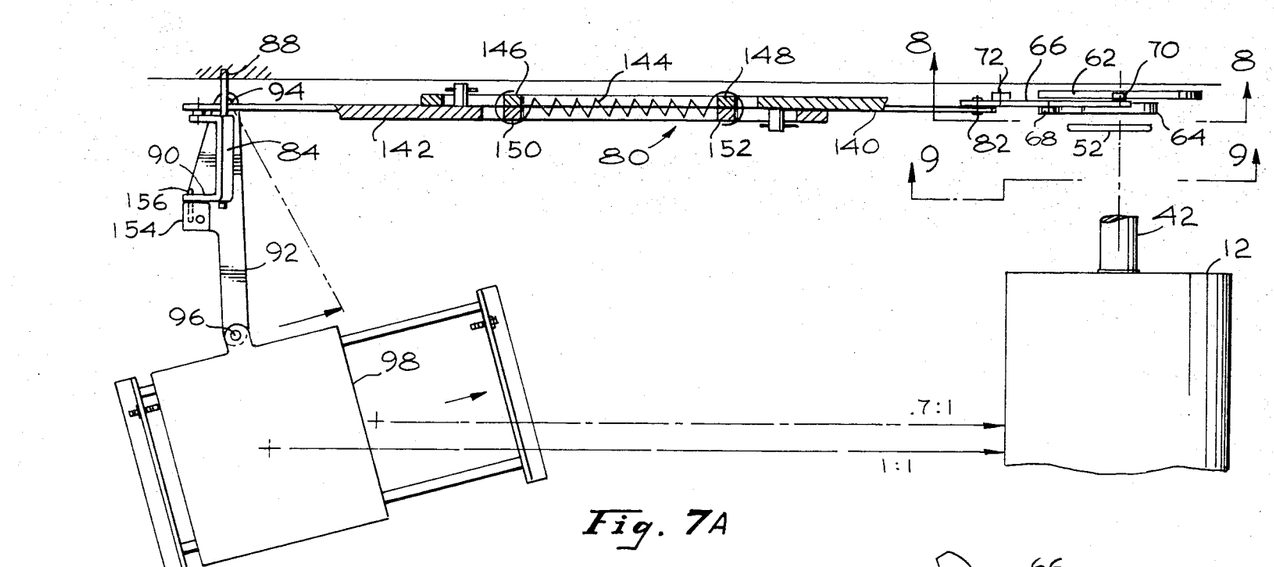
FIG. 7A is a plan view of the apparatus of FIG. 7.

FIGS. 7 and 7A, which illustrate the cams 62 and 64 that pivot the ratio-changing lever 66, show the manner of coupling the lever 66 to the lens carriage 98. The link assembly 80 has two links 140, 142, that are coupled together to enable stretching or compressing so as to bias the lens carriage towards either of its two extreme positions. A spring 144 extends between two spring-holding portions 146 and 148 of link 140, and between two portions 150 and 152 of the other link 142. When the links 140, 142 are pulled apart, the spring 144 can be stretched between link portions 148 and 150. When the link assembly is compressed, the spring 144 is stretched between the link portions 146 and 152. The link assembly therefore can be moved further than necessary to move the lens carriage between its two extreme positions, to bias the lens carriage towards these extreme positions.

The coupling between the link 142 and the lens carriage 98 is designed to change the plane of action of the applied forces, since the link 142 does not pull or push directly in the same plane as the lens carriage 98 moves. The lens carriage 98 is moved by the link 92 which pivots in the same plane as the lens carriage 98 moves. The crank 84 couples link 142 to link 92 through a sliding block 154 to make the linkage kinematically sound and have 1° of freedom. The sliding block fits freely over a pin 156 on arm 90 of crank 84 and pin 94 of link 920.

Figures 4, 6:
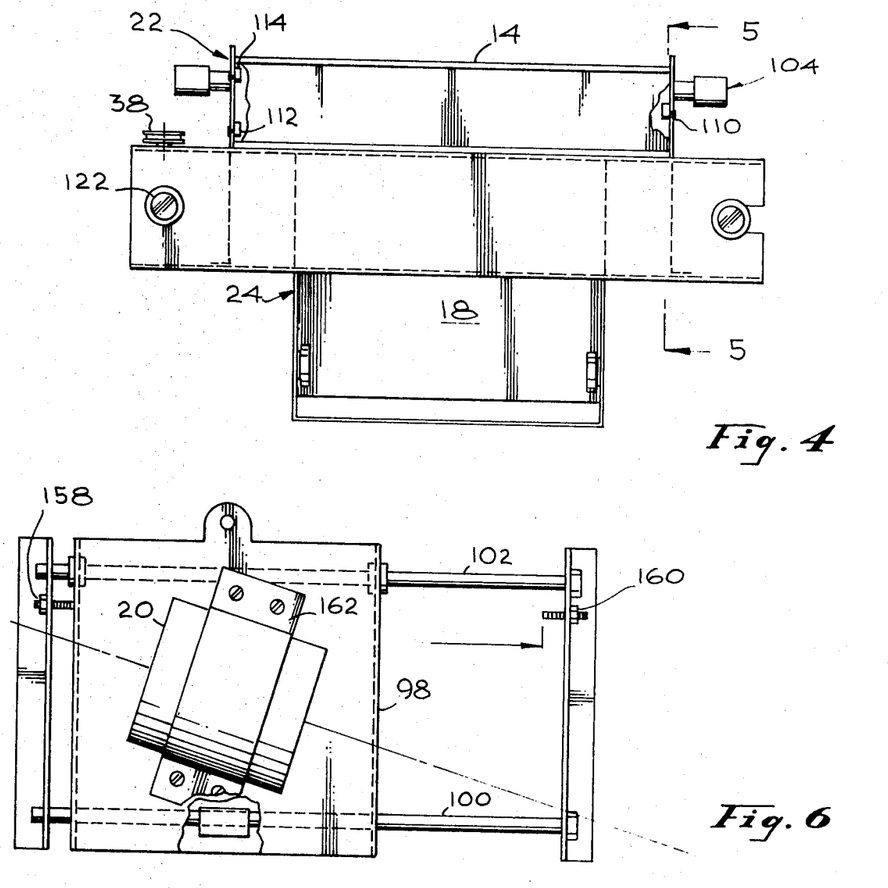
FIG. 4 is a plan view showing the first carriage of the FIG. of Fig. 1.
FIG. 6 is a view taken on the line 6—6 of FIG. 2.
Figure 6A:
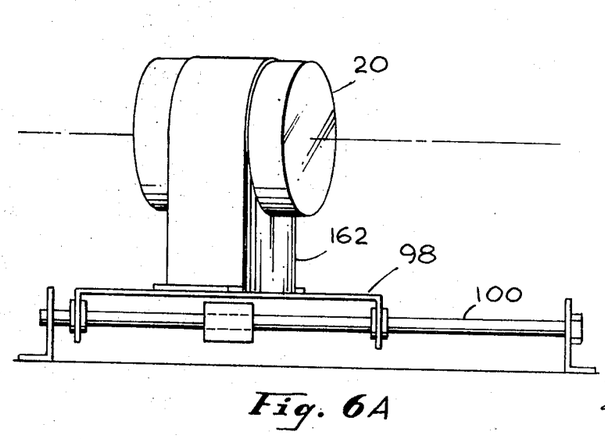
FIG. 6A is a side elevation view of the apparatus of FIG. 6.

FIGS. 6 and 6A illustrate details of the lens carriage 98. As mentioned above, the lens carriage is guided between two positions by rails 100, 102. A pair of adjustable stops 158 and 160 enable adjustment of the two extreme positions of the lens carriage. The lens 20 is generally formed by a set of several lenses which are fixed in position relative to one another and to a block 162 which mounts the lens on the carriage 98. As shown in these figures, the lens 20 moves in a direction which is angled from its optical center line in order to center the document image on the drum for two different sizes of documents, so the lens moves not only closer or further from the reproducing drum but laterally as well.

Thus, the invention provides a copying machine which enables two different copying ratios to be utilized, so that an operator can choose a 1:1 or 1:0.7 ratio of original document size to copy size. The changing to a 1:0.7 ratio is accomplished by a shift in the position of one mirror carriage with respect to the other, a shift of the lens carriage to a different distance and lateral position with respect to the reproducing drum and a driving of the mirror carriages at a different speed with respect to the reproducing drum surface speed. All of these adjustments can be accomplished easily by an operator moving a single lever or operating a single switch. Of course, different copying ratios other than a 1:1 and 1:0.7 could be chosen, and the apparatus can be constructed to enable a choice of more than two different ratios. The apparatus can be used in a variety of copying systems including systems which employ belts as the drum means instead of cylindrical drums, to carry sheets of electrostatic copy paper or the like.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus for reproducing documents and like material comprising:
   document-holding means for holding documents to be reproduced;
   reproducing drum means;
   means for rotating said drum means;
   optical means for forming an image of said documents onto said drum means selectively at first and second copying ratios, including at least one carriage guided in movement along a carriage path across said document-holding means and a plurality of optical elements for directing light from said documents to said drum means, at least one of said optical elements mounted on said carriage; and
   carriage moving means for driving said carriage along said carriage path selectively at first and second speeds relative to the speed of said drum means.

2. The apparatus described in claim 1 wherein:

said means for driving said carriage includes cable-winding means for pulling a cable, a compensating pulley, a cable extending from said cable-winding means around said compensating pulley and to said carriage, and means for selectively moving said compensating pulley as said cable-winding means pulls said cable, to selectively increase the speed of said carriage.

3. The apparatus described in claim 1 wherein:

said means for driving said carriage includes cable-driving means for pulling a cable as said drum means rotates to reproduce a document, cable-holding means for holding an end of a cable, a pulley mounted on said carriage, and a cable having one end portion engaged with said cable-driving means, a middle portion extending about said pulley on said carriage, and an opposite end portion engaged with said cable holding means; and including means for repositioning said cable-holding means between first and second positions to reposition said carriage independently of said cable-driving means.

4. The apparatus described in claim 1 wherein:

said optical means comprises a lens carriage for movement along a path at least partially towards and away from said reproducing drum, a lens mounted on said lens carriage, a plurality of mirror means disposed between said document-holding means and said lens, means for shifting said mirror means to increase and decrease the optical path length between said document-holding means and said lens, and means for moving said lens carriage to move said lens closer and further from said reproducing drum means as said mirror means is moved to increase and decrease said optical path length, respectively.

5. The apparatus described in claim 1 wherein:

said document-holding means includes means for locating the corner of rectangular documents at a fixed position, so that documents of first and second sizes can be located with one corner at the same position on said document-holding means; and said optical means includes a lens for focusing an image on said reproducing drum means, and means for shifting said lens between first and second positions with respect to said drum means to form images to substantially the same size onto said drum means of documents of said first and second sizes, said second position spaced laterally from said first position as well as located closer to said drum means than said first position to focus the images of said documents of first and second sizes on substantially the same region of said drum means.

6. The apparatus described in claim 1 wherein:

said optical means includes a lens carriage mounted for movement between first and second positions closer and further from said drum means, respectively, a link assembly coupled to said lens carriage, and means for pulling and pushing said link assembly to move said carriage between said positions;

said link assembly including first and second links and spring means for elastically resisting stretching, said spring means extending between a first portion of said first link and a first portion of said second link which is further from said drum means than said first portion of said first link, and between a second portion of said first link and a second portion of said second link which is closer to said drum means than said second portion of said first link, whereby to elastically urge said lens carriage towards the position to which it has been moved.

7. Apparatus for reproducing documents and like material comprising:

holding means for holding material to be reproduced;

a first carriage mounted for movement across said holding means;

a second carriage mounted for movement along a path substantially parallel to the path of said first carriage;

reproducing drum means;

first mirror means mounted on said first carriage for deflecting light from said material to be reproduced toward said second carriage;

second mirror means mounted on said second carriage for deflecting light from said first mirror means along a path to said reproducing drum means;

lens means disposed along the path of light from said holding means to said mirror means to said drum means, for forming an image of material on said holding means at said drum means;

cable winding means;

a compensating pulley;

a pulley mounted on said second carriage;

cable means having a first end coupled to said cable-winding means and a second end, said cable means extending from said cable-winding means about said compensating pulley, along the path of said first carriage and fixed to said first carriage, to said second carriage and about said pulley mounted on said second carriage;

means for holding said second end of said cable; and means for moving said compensating pulley to vary the speed of said carriages.

8. The apparatus described in claim 7 wherein:

said means for holding said second end of said cable comprises an arm fixed to said cable, a cam, means for moving said cam between a plurality of positions, and a cam follower for coupling said cam to said arm to move it, whereby to enable adjustment of the initial position of said second carriage relative to said first carriage.

9. Apparatus for reproducing material comprising:

means for holding material to be reproduced;

a first carriage mounted for movement substantially across said means for holding material;

a second carriage mounted for movement along a path substantially parallel to the path of said first carriage;

first mirror means mounted on said first carriage for deflecting light towards said second carriage;

second mirror means mounted on said second carriage for deflecting light from said first mirror means;

a drum;

a lens for focusing light from said second mirror means onto said drum;

means for driving said drum;

means for driving said first carriage at a predetermined speed with respect to the surface speed of said drum, and for driving said second carriage at one-half the speed of said first carriage; and means for selectively shifting said second carriage closer to said first carriage and said lens further from said drum, or shifting said second carriage further from said first carriage and said lens closer to said drum.

10. The apparatus described in claim 9 wherein:

said means for driving said first and second carriages comprises cable-driving means for pulling a cable, a compensating pulley, a cable extending from said cable-driving means around said compensating pulley and to said carriages, means for driving said cable-driving means to move said carriages, and means for moving said compensating pulley as said cable-driving means pulls said cable, to increase the speed of said carriages.

11. The apparatus described in claim 9 wherein:

said means for driving said first and second carriages includes cable-winding means coupled to said drum, a pulley mounted on said second carriage, a cable having a first end coupled to said cable-winding means and middle portions fixed to said first carriage and extending around said second carriage, and means for holding an end of said cable opposite said end which is fixed to said cable-winding drum; and including a compensating pulley;

means for guiding a portion of said cable which lies between said cable-winding means and first carriage, around said compensating pulley; and means for selectively holding said compensating pulley stationary and moving it to pull said cable, whereby to enable a change in the speed of said carriage with respect to said drum.

12. The apparatus described in claim 11 including:

means for repositioning said means for holding an end of said cable, to shift the position of said second carriage relative to said first carriage.

13. The apparatus described in claim 9 wherein:
said means for selectively shifting comprises at least one cam, a pivotally mounted ratio-changing lever having at least one cam follower coupled to said cam, a pivotally mounted carriage-shifting lever coupled to said ratio-changing lever and fixed to one end of said cable, a lens carriage for guiding said lens in movement with a component toward and away from said reproducing drum, and means for coupling said ratio-changing lever to said lens carriage.